F. A. BIDWELL.
Bolt for Patching Boilers.
No. 202,403. Patented April 16, 1878.
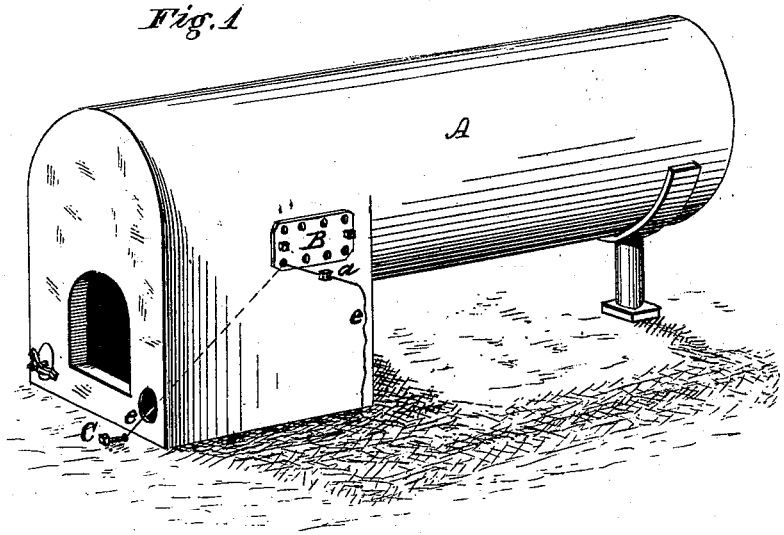
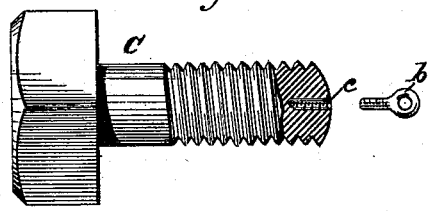
Witnesses:
Allen Tenny
William S. Longdon
Inventor
Francis A. Bidwell

UNITED STATES PATENT OFFICE.

FRANCIS A. BIDWELL, OF NORWICH, CONNECTICUT.

IMPROVEMENT IN BOLTS FOR PATCHING BOILERS.

Specification forming part of Letters Patent No. 202,403, dated April 16, 1878; application filed January 16, 1878.

*To all whom it may concern:*

Be it known that I, FRANCIS A. BIDWELL, of Norwich, in the county of New London and State of Connecticut, have invented a new and useful Improvement in Bolts for Soft-Patching Boilers and other purposes, which improvement is fully set forth in the following specification, reference being had to the accompanying drawings, in—

Figure 1 of which A is a boiler; B, a soft patch; C, the bolt connected to the wire $e$, which has the nut $a$ threaded upon its outer end. Fig. 2 shows an enlarged view of bolt, with female screw-thread at $c$, with $b'$, the detachable eyebolt.

My invention consists of an eye or hook attached to the end of a bolt, for the purpose of making the same fast to a wire or string to patch boilers or other articles.

One advantage to be gained by my invention is that you can draw the bolt to place and hold the same until the nut is screwed on to the bolt and the patch secured to the boiler, after which the eye or hook can be removed. Previous to my invention the string attached to the thread of bolt had to be removed before the nut could be screwed on, and oftentimes the bolt was lost by the string breaking or pulling off from the thread. With the aid of my invention the wire can be attached directly to the eye or hook without using a string, thus avoiding danger of breaking the string and losing the bolt.

I am aware that various methods similar to mine have been devised—as, for example, tying a wire around the threads of the bolt. This is objectionable, as the wire often gets cut off in entering the bolt in a small hole; and, again, after being frequently bent, the wire gets weak and breaks off at its connection.

I lay no claim whatever to the process or method of soft-patching boilers, consisting, in general terms, in attaching one end of a cord or wire to the end of a bolt, and passing the other end out through the inside to the outside of the boiler through the bolt-hole, and threading the nut on the wire. This I fully concede to have been long practiced. I only claim my bolt as an article, as set forth and described.

I do not claim, either, a bolt with a hole passing through it at right angles to the direction of the bolt, through which a wire is passed, upon which wire the nut is strung, as this is a different invention. My opening in the end of the bolt is in the direction of its length, and to receive an eye-piece, which can be kept constantly attached to the same wire, and used separately with different bolts.

Nor do I claim, broadly, the improvement in fixing plates to boilers, consisting in providing the bolt with an eye in the end thereof for attaching a hook or wire thereto, passing said hook or wire through some opening in the boiler, and through the bolt-hole and the nut, and holding the bolt in position while the nut is screwed thereon.

I claim as my invention—

A bolt for soft-patching boilers and other analogous purposes, furnished with an opening in its end, in combination with a detachable eye-piece to be inserted in said opening, said eye-piece serving for the attachment of a cord or wire, as and for the purposes set forth.

FRANCIS A. BIDWELL.

Witnesses:
ALLEN TENNY,
WILLIAM S. CONGDON.